UNITED STATES PATENT OFFICE.

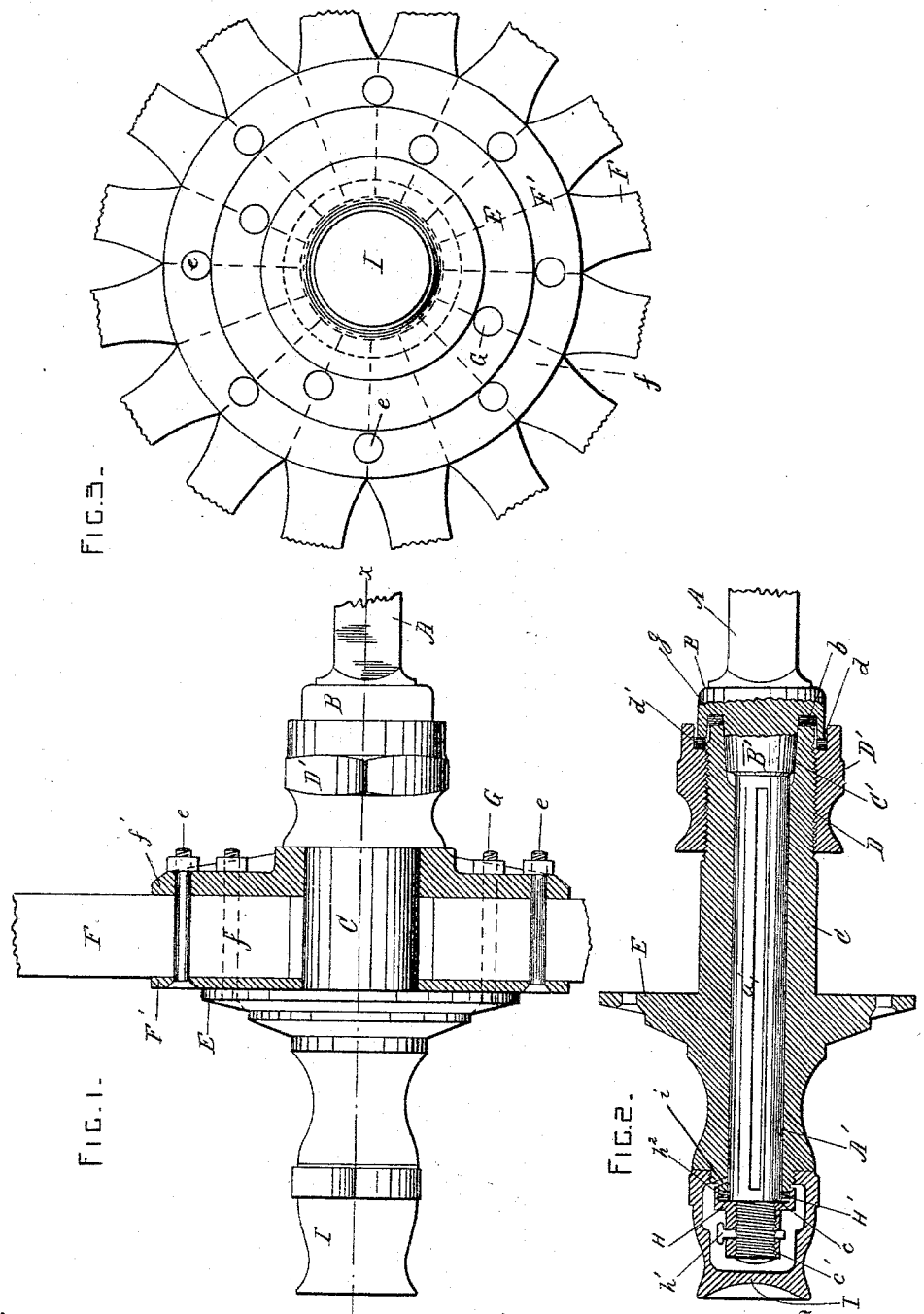

JEAN BAPTISTE GARAND, OF MONTREAL, CANADA.

WHEEL-HUB.

SPECIFICATION forming part of Letters Patent No. 584,141, dated June 8, 1897.

Application filed January 25, 1897. Serial No. 620,628. (No model.)

*To all whom it may concern:*

Be it known that I, JEAN BAPTISTE GARAND, a citizen of the Dominion of Canada, residing at the city and district of Montreal, Province of Quebec, Canada, have invented certain new and useful Improvements in Wheel-Hubs; and I do hereby declare the following to be a full, clear, and exact description of the invention, such as will enable others skilled in the art to which it appertains to make and use the same.

This invention relates to wheel-hubs; and it consists in the novel construction and combination of the parts hereinafter fully described and claimed.

In the drawings, Figure 1 is a side view of the hub, partly in section. Fig. 2 is a longitudinal section taken on the line $x\ x$ in Fig. 1. Fig. 3 is a front view of the wheel-hub.

A is the axle, which is of any approved construction.

A' is the axle-bearing, provided with a longitudinal groove $a'$ for oil.

B is a collar on the axle, and $b$ is a recess formed in the side of the collar.

B' is a conical portion of the bearing projecting from the bottom of the recess $b$. A shoulder $c$ is formed at the outer end of the bearing A', and $c'$ is a screw-threaded portion beyond the shoulder $c$.

C is the wheel-hub, which is journaled on the bearing A', and C' is a conical portion journaled on the conical portion B'. The inner end of the hub is provided with a screw-threaded portion D, and D' is a nut engaging with the portion D. A recess $d$ is formed in the nut for the projecting annular portion of the collar B to enter, and $d'$ is a packing-washer in the bottom of the recess $d$.

E is a circular flange projecting from the hub C.

F are the spokes of the wheel, provided with tapering ends $f$, which are fitted together.

F' is a plate on one side of the ends $f$, and $f'$ is a plate on the other side. Bolts $e$ are passed through the plates F' and $f'$ and through the meeting portions of the ends $f$, and these bolts securely fasten the said spokes to the said plates. The plates F' and $f'$ are slid upon the hub C, and the plate F' comes next to the flange E.

G are bolts which pass through the flange E and through the plates F' and $f'$ and the meeting portions of the ends $f$ of the spokes. The bolts G are arranged intermediate of the bolts $e$ and nearer to the center of the axle-bearing. The nut D' is screwed tightly against the plate $f'$ and secures the spokes against lateral displacement. A packing-washer $g$ is interposed between the end of the hub and the bottom of the recess $b$.

H is a nut screwed on the screw-threaded portion $c'$ of the axle and which bears against the shoulder $c$. A pin $h'$ prevents the nut H from working loose, and the said nut prevents the hub from sliding off the axle-bearing.

H' is a recess in one end of the nut H, and $h^2$ is a packing-washer interposed between the end of the hub and the bottom of the recess H'.

I is a hollow cap which is screwed onto the end of the hub over the nut H. This cap is filled with oil, and $i$ is a hole in the end portion of the wheel-hub, communicating with the oil-cup. The oil in the cap is caught by this hole as the hub revolves and is conducted into the oil-groove in the bearing.

What I claim is—

The combination, with an axle provided with a collar B having a recess $b$ in one side, a conical bearing B', a cylindrical bearing A', and a screw-threaded portion $c'$ at the end of the bearing A'; of a wheel-hub journaled on the bearings A' and B' and provided with a screw-threaded portion D, and a flange E; a nut screwed on the portion D and provided with a recess $d$ engaging with the projecting annular portion of the collar B, said nut operating to clamp the spokes against the flange E, a nut H screwed on the portion $c'$ and preventing the hub from moving endwise, and packing-washers in the recesses $b$ and $d$, substantially as set forth.

In testimony whereof I affix my signature in presence of two witnesses.

JEAN BAPTISTE GARAND.

Witnesses:
   J. A. MARION,
   A. PAGÉ.